US010310557B1

(12) United States Patent
Wu

(10) Patent No.: US 10,310,557 B1
(45) Date of Patent: Jun. 4, 2019

(54) MOBILE DEVICE PROTECTING COVER CAPABLE OF STORING A TOUCH PEN

(71) Applicant: ATENBO ENTERPRISE CO., LTD, Taoyuan (TW)

(72) Inventor: Mao-Sung Wu, Taoyuan (TW)

( * ) Notice: Subject to any disclaimer, the term of this patent is extended or adjusted under 35 U.S.C. 154(b) by 0 days.

(21) Appl. No.: 15/982,067

(22) Filed: May 17, 2018

(51) Int. Cl.
| | |
|---|---|
| *G06F 1/16* | (2006.01) |
| *G06F 3/041* | (2006.01) |
| *G06F 1/3203* | (2019.01) |
| *G06F 3/0488* | (2013.01) |

(52) U.S. Cl.
CPC .......... *G06F 1/1628* (2013.01); *G06F 1/1656* (2013.01); *G06F 1/3203* (2013.01); *G06F 3/0416* (2013.01); *G06F 3/0488* (2013.01); *G06F 2200/1632* (2013.01)

(58) Field of Classification Search
CPC ........... G06F 2200/1632; G06F 1/1626; G06F 1/1613; G06F 1/1628; G06F 3/0488; G06F 1/1656; G06F 3/0416; G06F 1/3203; A45C 2011/003
See application file for complete search history.

(56) References Cited

U.S. PATENT DOCUMENTS

| | | | | |
|---|---|---|---|---|
| 6,532,148 B2 * | 3/2003 | Jenks | ..................... | G06F 1/1626 343/702 |
| 6,681,333 B1 * | 1/2004 | Cho | ..................... | G06F 1/1626 345/179 |
| 8,194,055 B2 * | 6/2012 | Liu | ..................... | G06F 1/1656 345/179 |
| 8,390,601 B2 * | 3/2013 | Liang | ..................... | G06F 1/1613 178/19.01 |
| 8,390,602 B2 * | 3/2013 | Liang | ..................... | G06F 1/1613 178/19.01 |
| 8,493,368 B2 * | 7/2013 | Hsieh | ..................... | G06F 3/03545 178/19.01 |
| 8,989,372 B2 * | 3/2015 | Choi | ..................... | H05K 5/0004 379/447 |
| 2004/0032402 A1 * | 2/2004 | Kuo | ..................... | G06F 1/1626 345/179 |
| 2010/0147710 A1 * | 6/2010 | Lebauer | ..................... | A45C 11/008 206/234 |
| 2012/0154998 A1 * | 6/2012 | Nonomura | ..................... | G06F 1/1616 361/679.01 |
| 2014/0162735 A1 * | 6/2014 | Oh | ..................... | H04M 1/185 455/575.8 |
| 2016/0018854 A1 * | 1/2016 | Yu | ..................... | G06F 1/1669 361/679.08 |
| 2016/0277835 A1 * | 9/2016 | Kim | ..................... | H04R 1/028 |
| 2017/0102739 A1 * | 4/2017 | Zaloom | ..................... | G06F 1/1656 |
| 2018/0039343 A1 * | 2/2018 | Park | ..................... | G06F 1/1632 |

* cited by examiner

*Primary Examiner* — Abhisek M Rathod

(57) ABSTRACT

A mobile device protecting cover capable of storing a touch pen includes a touch pen slot and an insertion port disposed on the back side of the protecting cover. The touch pen slot has a press switch button disposed on an inner side wall for pressing the touch pen, and the inner side wall has a groove configured to be corresponsive to the press switch button, and extended from the insertion port as a starting end towards the other end of the touch pen slot. The protecting cover is used to cover a mobile phone or a tablet PC and insert the touch pen into the touch pen slot. When the touch pen is inserted or removed, the structure of the groove and the inner side wall achieves main effect of turning on or off the power by the touch pen.

4 Claims, 4 Drawing Sheets

MOBILE DEVICE PROTECTING COVER CAPABLE OF STORING A TOUCH PEN

BACKGROUND OF THE INVENTION

Field of the Invention

The present invention relates to a protecting cover, in particular to the protecting cover for covering a mobile electronic device such as a mobile phone or a tablet PC, and the mobile device protecting cover is capable of inserting and storing a touch pen.

Description of Related Art

A protecting cover made of plastic or silicone is generally used to protect a mobile electronic device such as a mobile phone or tablet PC and prevent the mobile electronic device from impacts or worn-outs. A conventional protecting cover usually includes a back cover configured to be corresponsive to the back side of the mobile electronic device and a frame integrally formed at the periphery of the back cover, so that the mobile phone or tablet PC can be mounted to the frame to cover the back side and periphery of the mobile electronic device and achieve the protection effect.

Some consumers get used to operate the mobile electronic device by a touch pen or use a specific touch pen to satisfy the requirements of a certain APP (such as drawing or photo editing software). The conventional protecting cover seldom provides the function of storing the touch pen or storing both mobile electronic device and touch pen. Even though some protecting covers can be used to insert or store the touch pen, these protecting covers simply give the function of storage only without any other design to provide a convenient use to users. For example, the users need to press a switch of the touch pen by a finger in order to turn the power off before the protecting cover is inserted. On the other hand, when it is necessary to take the touch pen out, the users need to press the switch by a finger to turn the power on. Furthermore, the users have no way to know whether or not the inserted touch pen has triggered the switch to turn on the power by mistake.

SUMMARY OF THE INVENTION

In view of the aforementioned drawbacks of the conventional mobile electronic device protecting cover, the inventor of the present invention based on years of experience in the related industry to conduct extensive researches and experiments, and finally developed a mobile device protecting cover capable of storing a touch pen, in hope of achieving the effect of synchronously turning off the power when the touch pen is inserted into the protecting cover or synchronously turning on the power when the touch pen is removed. This invention has the effects of facilitating users to remove the touch pen, monitoring whether or not the touch pen has triggered the switch to turn off the power, and promoting the heat dissipation of the touch pen.

It is a primary objective of the present invention to provide a mobile device protecting cover capable of storing a touch pen, and the mobile device protecting cover comes with a structural design with a touch pen slot formed at the back side of the mobile device protecting cover and provided for storing a touch pen, and this design has the effects of synchronously turning off the power when the touch pen is inserted into the protecting cover and synchronously turning on the power when the touch pen is removed.

A secondary objective of the present invention is to provide a mobile device protecting cover capable of storing a touch pen, wherein the structure of with a touch pen slot formed at the periphery of the protecting cover achieves the effects of facilitating users to remove the touch pen, monitoring whether or not the touch pen has triggered the switch to turn off the power, and promoting the heat dissipation of the touch pen.

To achieve the aforementioned and other objectives, the present invention provides a mobile device protecting cover capable of storing a touch pen, applied for covering a mobile electronic device, and capable of inserting and storing a touch pen, comprising: a protecting cover, having a back cover for covering the back side of a mobile electronic device, a frame integrally formed and protruded from a side of the front of the back cover, a chamber formed in the frame for installing the mobile electronic device therein; wherein a touch pen slot is formed on the back side of the back cover, and the touch pen slot has an insertion port formed on a lateral side of the back cover, and the touch pen slot is extended from the insertion port towards the other corresponding side to form a deep hole. The touch pen slot has an inner side wall with a press switch button for pressing a side of the touch pen, and the inner side wall has a groove configured to be corresponsive to the press switch button disposed on a side of the touch pen, and the groove is extended from the insertion port as a starting end towards the other end of the touch pen slot.

In the mobile device protecting cover capable of storing a touch pen, the insertion port is preferably extended from a front edge of the frame as a starting end of the groove towards the other end of the touch pen slot.

In the mobile device protecting cover capable of storing a touch pen, the groove preferably has a guide slope formed at an end of the groove and coupled to the inner side wall.

In the mobile device protecting cover capable of storing a touch pen, the groove preferably has a guide slope formed at an end of the groove and coupled to the inner side wall.

In the mobile device protecting cover capable of storing a touch pen, the touch pen slot preferably has a notch formed at the rear side of the insertion port and extended towards the other end of the touch pen slot, and the notch is provided for latching a bump on a side of the rear end of the touch pen.

In the mobile device protecting cover capable of storing a touch pen, the notch preferably has a recess formed at an end of the notch and provided for a user' finger to extend into the recess to pull out the bump.

In the mobile device protecting cover capable of storing a touch pen, the protecting cover preferably has a stripe window formed on the back side of the protecting cover and communicated to the touch pen slot, and the stripe window is provided for exposing a power light disposed on a side of the touch pen.

In the mobile device protecting cover capable of storing a touch pen, the protecting cover preferably has a rib integrally protruded from the back side of the protecting cover, and the touch pen slot is disposed in the rib, and the insertion port is disposed at an end of the rib.

The mobile device protecting cover capable of storing a touch pen further comprises a touch pen having a pen nib disposed at the front end of the touch pen, the bump disposed on a side of the rear end of the touch pen and configured to be corresponsive to the notch, the press switch button disposed on a side of the touch pen, and the power light disposed on the other side of the touch pen and configured to be corresponsive to the stripe window.

DESCRIPTION OF THE INVENTION

The aforementioned and other objects, characteristics and advantages of the present invention will become apparent with the detailed description of the preferred embodiments and the illustration of related drawings as follows.

Figure 1:
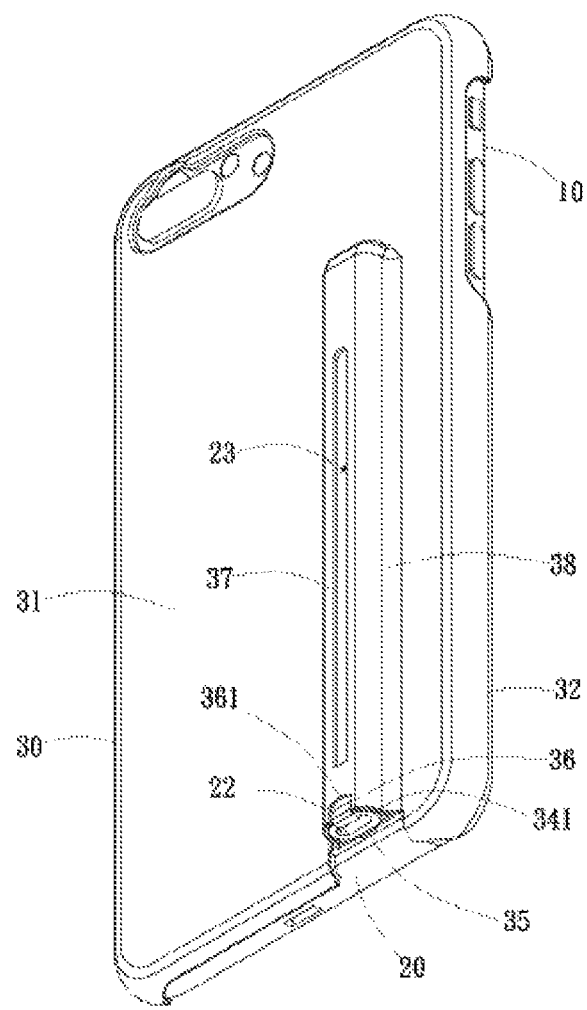
FIG. 1 is a perspective view showing a using status of a mobile device protecting cover in accordance with a preferred embodiment of the present invention.
Figure 2:
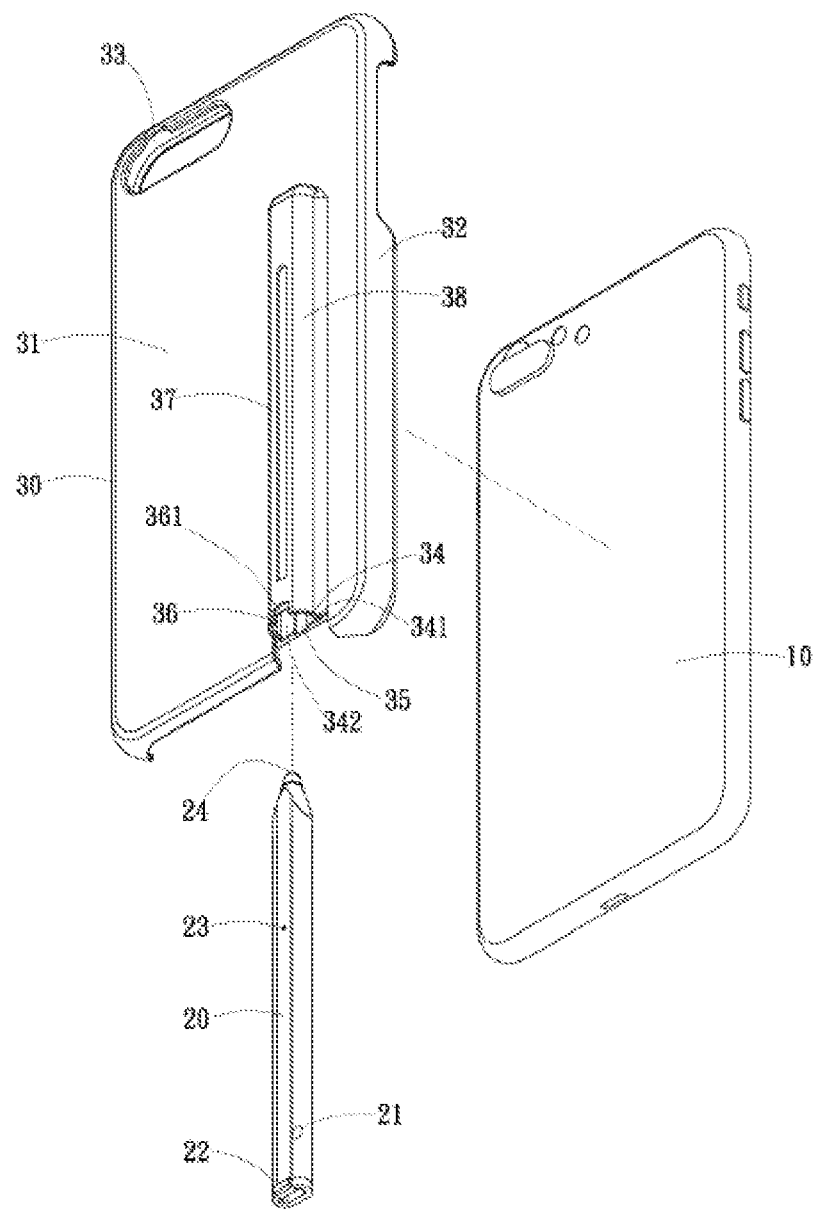
FIG. 2 is an exploded view showing a using status of a mobile device protecting cover in accordance with a preferred embodiment of the present invention.
Figure 3:
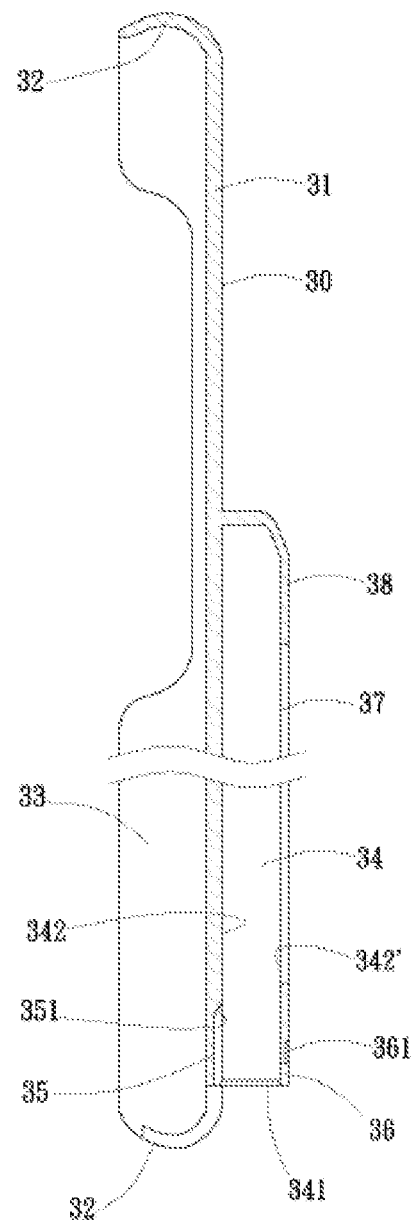
FIG. 3 is a cross-sectional view of a mobile device protecting cover in accordance with a preferred embodiment of the present invention.

With reference to FIGS. 1 and 2 for a mobile device protecting cover capable of storing a touch pen in accordance with the present invention, the mobile device protecting cover is used for covering a mobile electronic device 10 such as a mobile phone or a tablet PC to prevent the mobile electronic device 10 from impacts or worn-outs, and the mobile electronic device is capable of inserting and storing a touch pen 20. In FIGS. 2 and 3, the mobile device protecting cover in accordance with a preferred embodiment of the present invention comprises: a protecting cover 30, preferably made of plastic, rubber, silicone or any combination of the above and integrally formed, and the specific structure of the protecting cover comprises a back cover 31 for covering the back side of the mobile electronic device 10, a frame 32 integrally formed and protruded from a lateral side of the back cover 31, and a chamber 33 formed in the frame 32 for receiving the mobile electronic device 10.

Figure 4:
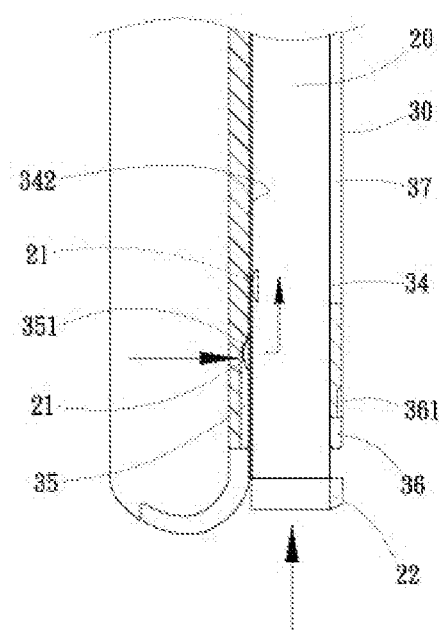
FIG. 4 is a schematic view showing an operation of a mobile device protecting cover provided for inserting a touch pen in accordance with the present invention.

Particularly, a touch pen slot 34 is integrally formed on a back side of the back cover 31, and the touch pen slot 34 has an insertion port 341 formed on a lateral side of the back cover 31, the touch pen slot 34 is extended from the insertion port 341 towards the other corresponding side to form a deep hole; the touch pen slot 34 has two corresponding inner side walls 342, 342', and the gap between the two inner side walls 342, 342' is equal to or slightly greater than the width of the touch pen 20, so that when the touch pen 20 is inserted into the touch pen slot 34, one of the inner side walls 342 acts as a structure of a press switch button 21 for pressing a side of the touch pen 20, and the inner side wall 342 has a groove 35 formed thereon and configured to be corresponsive to the press switch button 21 on a side of the touch pen 20, and the groove 35 is extended from the insertion port 341 acting as a starting end towards the other end of the touch pen slot 34. Specifically, the insertion port 341 is extended from a front edge adjacent to the frame 32 acting as starting end of the groove 35 towards the other side of the touch pen slot 34, and a guide slope 351 is formed at an end of the groove 35 and coupled to the inner side wall 342 (as shown in FIGS. 3 and 4), so as to form the mobile device protecting cover capable of storing a touch pen in accordance with the present invention.

Figure 5:
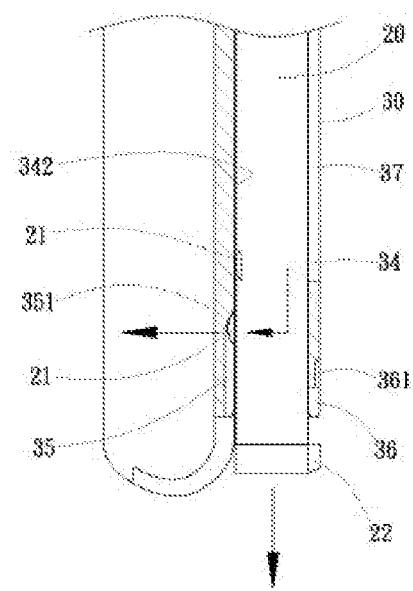
FIG. 5 is a schematic view showing an operation of a mobile device protecting cover provided for pulling out a touch pen in accordance with the present invention

When the mobile device protecting cover of the present invention is used, a mobile electronic device 10 such as a mobile phone or a tablet PC is placed into the chamber 33 at the front of the protecting cover 30, so that the frame 32 hooks an edge of the mobile electronic device 10. The protecting cover of the present invention may be used for inserting and storing the touch pen 20. When the touch pen 20 is inserted into the touch pen slot 34 (as shown in FIG. 4), and the press switch button 21 is entered into the groove 35 until the touch pen 20 is inserted completely, the press switch button 21 slides from the groove 35 through the guide slope 351 to the inner side wall 342 (as indicated by the dotted arrow in the figure), so that the inner side wall 342 can be used to press the press switch button 21 to produce an insertion while turning off the power, so as to achieve the effect of turning off the power when the touch pen 20 is inserted. On the other hand, when the touch pen 20 is removed (as shown in FIG. 5), the press switch button 21 is separated from the inner side wall 342 and protruded from the groove 35 (as indicated by the dotted arrow in the figure) to achieve the effect of turning on the power automatically when the touch pen 20 is removed.

In FIGS. 2 and 3, the touch pen slot 34 of the present invention has a notch 36 formed on a back side of the insertion port 341 and extended towards the other side of the touch pen slot 34, so that the notch 36 may be used to latch a bump 22 on a side of the rear end of the touch pen 20 (as shown in FIG. 1). The notch 36 has a recess 361 formed at an end of the notch 36 and provided for a user's finger to pull out the bump 22, so as to facilitate the action of taking out the touch pen 20. In addition, the protecting cover 30 has a stripe window 37 formed on a back side of the protecting cover 30 and communicated to the touch pen slot 34, and the stripe window 37 is provided for exposing a power light 23 on a side of the touch pen 20 (as shown in FIG. 1), so that a user may check whether or not the power light 23 is on or off from the stripe window 37 to ensure that the power is turned off after the touch pen 20 is inserted. In the meantime, the stripe window 37 may be used as a heat dissipating window to prevent heat from being accumulated in the touch pen 20. In addition, a rib 38 may be integrally formed and protruded from the back side of the protecting cover 30, so that when the touch pen slot 34 is implemented in the rib 38, the insertion port 341 of the touch pen slot 34 is disposed at an end of the rib 38. The structure of the rib 38 can prevent the protecting cover 30 from having a too-large thickness.

In summation, the protecting cover capable of storing a touch pen in accordance with the present invention mobile device is primarily applied for covering a mobile electronic device 10, wherein the mobile electronic device 10 includes but not limited to a mobile phone or a tablet PC. The touch pen 20 may be combined with the protecting cover 30 to provide an accessory that can be sold altogether at the same time, and the structure of the touch pen 20 as shown in FIG. 2 has a pen nib 24 formed at the front end of the touch pen 20 and a bump 22 formed on a side of the rear end corresponding to the notch 36, and the touch pen 20 has a press switch button 21 disposed on a side, and a power light 23 disposed on the other side of the touch pen 20 and configured to be corresponsive to the stripe window 37. As to the electronic components inside the touch pen 20 are not limited in the embodiment, and thus they are not described in details.

While the invention has been described by means of specific embodiments, numerous modifications and variations could be made thereto by persons skilled in the art without departing from the scope and spirit of the invention set forth in the claims.

What is claimed is:

1. A mobile device protecting cover capable of storing a touch pen, applied for covering a mobile electronic device, and capable of inserting and storing the touch pen, comprising:

a protecting cover, having a back cover for covering the back side of the mobile electronic device, a frame integrally formed and protruded from a side of the front of the back cover, a chamber formed in the frame for installing the mobile electronic device therein;

wherein a touch pen slot is formed on the back side of the back cover, and the touch pen slot has an insertion port formed on a lateral side of the back cover, and the touch pen is extended from the insertion port towards the other corresponding side to form a deep hole, and the touch pen slot has an inner side wall for pressing a side of the touch pen, and the inner side wall has a groove configured to be corresponsive to a press switch button disposed on the side of the touch pen, and the groove is extended from the insertion port as a starting end towards the other end of the touch pen slot;

wherein the touch pen slot has a notch formed at the rear side of the insertion port and extended towards the other end of the touch pen slot, and the notch is provided for latching a bump at a side of the rear end of the touch pen;

wherein the notch has a recess formed at an end of the notch and provided for a user' finger to extend into the recess to pull out the bump; wherein the protecting cover has a stripe window formed on the back side of the protecting cover and communicated to the touch pen slot, and the stripe window is provided for exposing a power light disposed on a side of the touch pen;

wherein the protecting cover has a rib integrally protruded from the back side of the protecting cover, and the touch pen slot is disposed in the rib, and the insertion port is disposed at an end of the rib.

2. The mobile device protecting cover capable of storing the touch pen according to claim 1, wherein the insertion port is extended from a front edge of the frame as a starting end of the groove towards the other end of the touch pen slot.

3. The mobile device protecting cover capable of storing the touch pen according to claim 1, wherein the groove has a guide slope formed at an end of the groove and coupled to the inner side wall.

4. The mobile device protecting cover capable of storing the touch pen according to claim 1, further comprising the touch pen having a pen nib disposed at the front end of the touch pen, the bump disposed on a side of the rear end of the touch pen and configured to be corresponsive to the notch, the press switch button disposed on a side of the touch pen, and the power light disposed on the other side of the touch pen and configured to be corresponsive to the stripe window.

* * * * *